June 19, 1962 W. V. SMITH 3,039,314
LAWN MOWER BLADE BALANCE INDICATOR
Filed Dec. 3, 1959 2 Sheets-Sheet 1
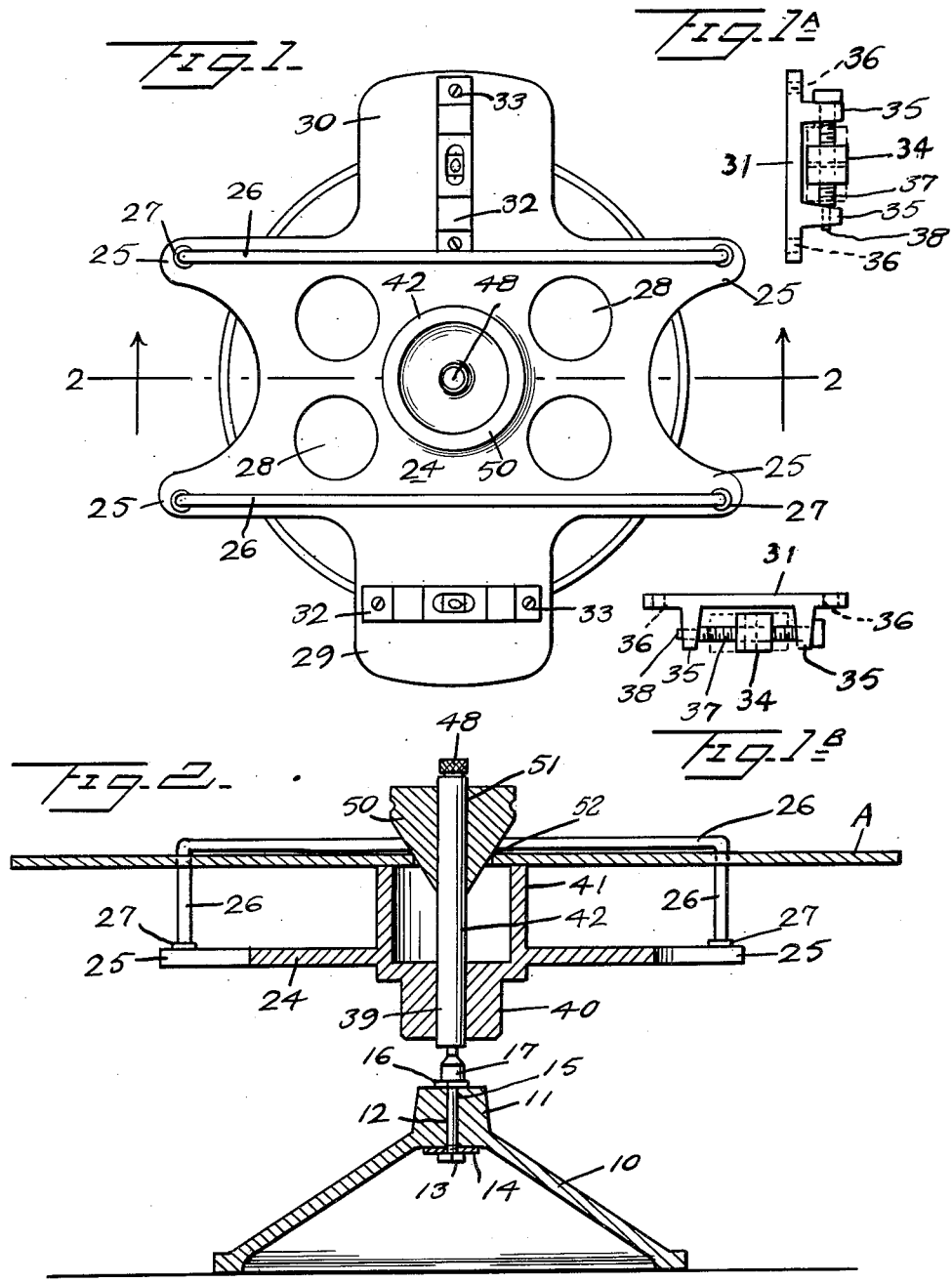
Wm. V. Smith
INVENTOR
BY C A Snow & Co.
ATTORNEYS.

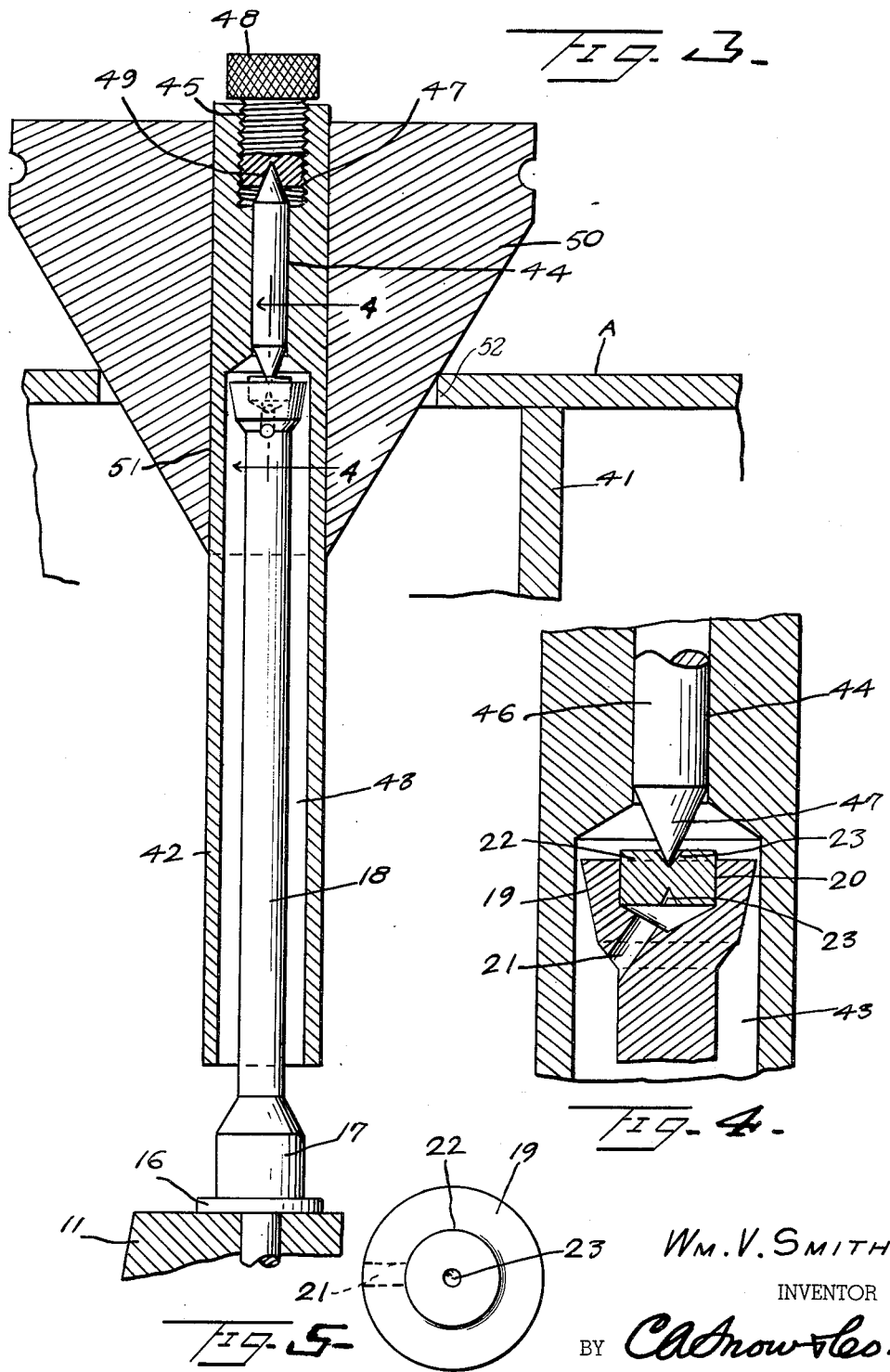

United States Patent Office 3,039,314
Patented June 19, 1962

3,039,314
LAWN MOWER BLADE BALANCE INDICATOR
William V. Smith, 801 W. Franklin St., Greenville, Ill.
Filed Dec. 3, 1959, Ser. No. 857,179
7 Claims. (Cl. 73—484)

This invention relates to a lawn mower blade balance indicator.

The present invention is an improvement over the lawn mower blade balance indicator described, illustrated and claimed in my co-pending application, Serial No. 779,195, filed on December 9, 1958, as to the features of the bearing mounting for the blade supporting table.

In the process of sharpening the blades for power lawn mowers of the type wherein the blades rotate in a horizontal position on the lawn mower, if any static unbalance is produced by removing the material of the blade in unequal amounts on the opposite sides of either the longitudinal or transverse center lines, dynamic unbalance will result after the blade has been replaced on the mower. This dynamic unbalance will result in undue vibrations of the rotating blade and such vibrations will produce excessive noise and abnormal wear of the rotary mounting of the blades.

An object of the present invention is to provide a structure for supporting a power lawn mower blade in the horizontal position and indicating any static unbalance, which latter should be corrected during the blade sharpening operation.

Another object of the present invention is to provide a structure for supporting a power lawn mower blade in the horizontal position, which structure has only a one point bearing mounting.

A further object of the present invention is to provide a structure for supporting a power lawn mower blade in the horizontal position, which structure has a delicately centered bearing support so that very slight variations in static unbalance may be detected.

A further object of the present invention is to provide a structure for supporting a power lawn mower blade in the horizontal position for indicating static unbalance, and one on which the blade may be readily mounted and from which it may be readily removed.

Still other objects, advantages and improvements will become apparent from the following specification, taken in connection with the accompanying drawing, in which:

FIGURE 1 is a top plan view of the lawn mower blade balance indicator according to the present invention, without the blade present on same.

FIG. 1a is a partial end elevational view, showing one of the balance adjusting means.

FIG. 1b is a partial side elevational view showing the other of the balance adjusting means.

FIG. 2 is a vertical sectional view, taken on the section line 2—2 of FIG. 1, but showing the blade in position.

FIG. 3 is an enlarged vertical sectional view showing the details of the central support and the bearing structure.

FIG. 4 is an enlarged vertical sectional view, taken on the section line 4—4 of FIG. 3 and looking in the direction of the arrows showing in greater detail the bearing structure.

FIG. 5 is a top plan view of the vertically positioned supporting rod and the bearing block carried by same.

Referring now to the drawings in detail and to FIG. 2 in particular, the structure includes a supporting pedestal 10 having at its top a central boss 11 and an axial bore 12 therethrough. A supporting rod 18 has an enlarged lower cylindrical end 16, 17 and an enlarged inverted upper frusto-conical end 19. This supporting rod is maintained in the vertical position by a stud bolt 15, which extends through the bore 12 in the boss 11. At its lower end this stud bolt is threaded and receives a nut 13, a washer 14 being interposed between this nut and the under face of the boss 11. At its upper end the stud bolt 15 is received in a suitably positioned threaded bore (not shown) in the enlarged lower end 17 of the supporting rod 18.

The table is indicated generally at 24. It has concavely curved ends along its longitudinal center line, which form with the side walls rounded corners 25. Gauge rods 26—26 are positioned parallel to the table 24 and at a height above same approximately equal to the height of the hollow central boss on the table plus the thickness of the mower blade. At their opposite ends the gauge rods 26—26 are downturned and are received in grommets 27, which are mounted in suitable holes in the rounded corners 25 of the table. A plurality of holes 28 are formed in the table 24 for saving weight. On the transverse center line of the table there are formed outwardly extending offset portions 29 and 30. Spirit levels 32 are mounted on the offset portions 29 and 30 by screws 33. The spirit level on the offset portion 29 is positioned longitudinally of the table 24 and the spirit level on its offset portion 30 is positioned transversely of the table.

On the under side of the offset portion 29 that carries the longitudinally positioned spirit level, there is mounted the longitudinal leveling means; similarly on the under side of the offset portion 30 that carries the transversely positioned spirit level, there is mounted the transverse leveling means. The leveling means are each comprised by a base bar 31 having parallel ears 35—35 thereon. The base bars are respectively secured on the under sides of the offset portions 29 and 30 of the table by the same screws 33 that hold the spirit levels 32 on the tops of the latter. These screws extend freely through suitable holes in the spirit levels 32 and registering holes (not shown) in the offset portions 29 and 30 of the table, and are received in suitable screw threaded holes 36 in the base bars 31—31. Each leveling means includes a screw threaded rod 37, which is received in a suitable screw threaded hole in one of the ears 35 on the base bar 34, and has at its far end a cylindrical portion 38, which is received in a plain hole in the other end 35. Cylindrical weights 34 having axially threaded bores therethrough are rotatably mounted on the threaded rods 37.

On the under surface of the table 24 there is formed a solid central boss 40, which has an axial bore 39 therethrough. Likewise, on its upper face the table is formed with a hollow annular boss 41.

A bearing sleeve 42 is received within the axial bore 39 in the solid boss 40 on the under side of the table 24. This bearing sleeve has a bore 43, which extends from one end for the greater part of its length, a screw threaded bore 45 which extends from the other end, and an axial bore 44 of lesser diameter between the two.

When the sleeve 42 is in its truly vertical position, the upper base of the enlarged frusto-conical end 19 of the supporting rod 18 is positioned with a slight clearance between its circumference and the circumference of the bore 19 within the sleeve. This upper bore has a socket 20 therein, which receives a bearing block 22. In the opposite faces of the bearing block 22 there are formed axially positioned bearing recesses 23—23. These recesses are conical in shape, the slant height being at 45° with respect to the axis, or the angle between the sides on a plane through the axis being 90°. The bearing recesses are provided on both sides of the bearing block 22 so that, when the bearing surface in the upper face of the bearing block becomes worn, the block may be removed from the socket 20 and inverted. A bore 21 is formed on an oblique axis from the socket 20 and through the side wall of the enlarged inverted frusto-conical end 19 of the supporting rod 18, at the juncture of the latter end and the cylindrical section of the rod. This bore allows a small diameter rod to be inserted from the outside into the socket 20 for ejecting the bearing block 22 therefrom, when same is inverted.

A pivot pin 46 having pivot points 47—47 at its opposite ends is force-fitted in the intermediate bore 44 in the bearing sleeve 43. The pivot points 47—47 on the opposite ends of the pivot pin 46 are also of conical shape, their slant heights being at 30° with respect to the axis, or the angle between the sides on a plane through the axis being 60°. A screw threaded plug 48 has a conical recess 49 in its face, which is complementary to the conical ends 47—47 of the pivot pin 46, and this screw plug is received within the screw threaded bore 45 in the bearing sleeve 42. The conical recess 49 in the screw plug receives the upper pivot point 47 on the pivot pin 46 and holds the lowest pivot point 47 in the conical recess 23 in the bearing block 22.

The mower blade to be, or in the process of being sharpened, is shown at A (FIG. 2) resting on the top of the hollow boss 41 on the table 24. It is an elongated member having beveled edges (not shown) and a hole 52 at the intersection of its longitudinal and transverse center lines. The hole 52 receives the driving shaft when the blade A is in position on the mower. A centering member 50, which is frusto-conical in shape throughout most of its length, has an axial bore 51 therethrough. This axial bore receives the bearing sleeve 42 and the frusto-conical section fits within the hole 52 in the mower blade A.

In operation, the table 24 is first adjusted to level position by setting the weights 34 on either or both the longitudinal and transverse leveling means. The mower blade A is positioned on the upper face of the hollow boss 41 on the table 24 and approximately in horizontal alignment with the longitudinally extending guide rails 26—26. Centering of the mower blade is accomplished by the frusto-conical centering member 50, which projects through the hole 52 in the blade and forces the latter into concentric position with respect to the bearing sleeve 42.

If the blade is heavier on one side of either its longitudinal or transverse center line than the other, the table will tilt, indicating the unbalance, which will be shown on the corresponding spirit level 32. The blade is then removed from the table and the indicated heavier edge is ground off. Then the blade is replaced on the table and the spirit levels 32—32 again observed to determine if the blade is now in static balance.

When the table 24 tilts, due to the blade A being out of balance, the wall of the bore 43 through the bearing sleeve 42 pivots about the upper base of the enlarged inverted frusto-conical end 19 of the bearing rod 18, the wall coming into contact with the slant height of the frusto-conical end 19. This tilting movement is also facilitated by the difference in taper of the recess in the bearing block 22 and the end 47 of the pivot pin 46, the slant height of the former being, as stated, tapered with respect to the axis at an angle of 45°; and the slant height of the latter being tapered with respect to the axis at 30°.

It will be understood that by alternately placing the mower blade A on the table 24, observing the degree of unbalance on the spirit levels 32—32, removing the blade from the table and grinding off the heavier edge, with a lesser amount of material to be removed each time, and replacing the blade on the table, an approximately perfect degree of static balance can be obtained.

Having now fully described my invention, what I claim as new and useful and desire to secure by Letters Patent of the United States is:

1. A structure for indicating the balance of mower blades having central openings, comprising a pedestal, a central supporting rod mounted vertically on said pedestal and having an enlarged inverted frusto-conical upper end with a socket therein, a bearing block having a conical recess in one face positioned in said socket, a table for supporting the mower blade having an opening therethrough, a pair of level indicating means mounted on said table at mutual right angles, a bearing member extending through the opening in the table and connected to said table and having an enlarged bore extending from one end for the greater part of its length surrounding the central supporting rod and receiving the enlarged inverted upper frusto-conical end of the latter with close clearance, a shorter threaded bore extending from the other end, and a bore of reduced diameter intermediate and connecting the said two bores, a pivot pin mounted in said bore of reduced diameter and received at one end in the conical recess in the bearing member, and a screw plug in the threaded bore of the bearing member contacting the other end of the pivot pin.

2. A structure for indicating the balance of mower blades having central openings, comprising a pedestal, a central supporting rod mounted vertically on said pedestal and having an enlarged inverted frusto-conical upper end and with a socket therein, a bearing block having a conical recess in one face positioned in said socket, a table for supporting the mower blade having an opening therethrough, a pair of level indicating means mounted on said table at mutual right angles, a bearing member extending through the opening in the table and connected to said table and having an enlarged bore extending from one end for the greater part of its length surrounding the central supporting rod and receiving the enlarged inverted upper frusto-conical end of the latter with close clearance, a shorter threaded bore, and a bore of reduced diameter intermediate and connecting the said two bores, a pivot pin having conical ends mounted in said bore of reduced diameter with one conical end received in the conical recess in the bearing block, and a screw plug having a conical recess in its face mounted in the threaded bore of the bearing member and receiving the other conical end of the pivot pin in said conical recess.

3. A structure for indicating the balance of lawn mower blades having central openings, comprising a pedestal, a central supporting rod mounted vertically on said pedestal and having an enlarged inverted frusto-conical upper end, a generally rectangular table for supporting the mower blade having oppositely extending offset portions along its transverse center line and a centrally positioned opening therethrough, a pair of level indicating means mounted on said table at mutual right angles, a longitudinally positioned level adjusting means on one offset portion of the table, a transversely positioned level adjusting means on the other portion of the table, a bearing member extending through the opening in the table and connected to said table and having an enlarged bore for the greater part of its length surrounding the central supporting rod receiving the enlarged inverted upper frusto-conical end of the latter with close clearance, and a pivot pin mounted in the bearing member beyond the bore and projecting into the latter and bearing on the top of the central supporting rod.

4. A structure for indicating the balance of mower blades having central openings, a central supporting rod mounted vertically on said pedestal and having an enlarged inverted frusto-conical upper end, a generally rectangular table for supporting the mower blade having oppositely extending offset portions along its transverse center line and a centrally positioned opening therethrough, a longitudinally positioned level indicating means on one face of one offset portion of the table, a longitudinally positioned level adjusting means on the other face of said one offset portion of the table, a transversely positioned level indicating means on one face of the other offset portion of the table, a transversely positioned level adjusting means on the other face of said other offset portion of the table, a bearing member extending through the opening in the table and connected to said table and having an enlarged bore for the greater part of its length surrounding the central supporting rod and receiving the enlarged inverted upper frusto-conical end of the latter with close clearance, and a pivot pin mounted in the bearing member beyond the bore and projecting into the latter and bearing on the top of the central supporting rod.

5. A structure for indicating the balance of lawn mower blades having central openings, comprising a pedestal, a central supporting rod mounted vertically on said pedestal and having an enlarged inverted frusto-conical upper end, a generally rectangular table having a central hollow boss positioned at the intersection of its longitudinal and transverse center lines for supporting the mower blade and integral offset portions along its transverse center line, a longitudinally positioned level indicating means on one face of one offset portion of the table, a longitudinally positioned level adjusting means on the other face of said one offset portion of the table, a transversely positioned level indicating means on one face of the other offset portion of the table, a transversely positioned level adjusting means on the other face of said other offset portion of the table, a bearing sleeve secured at its lower end to the bottom of the table positioned axially of the central hollow boss and having an enlarged bore for the greater part of its length, surrounding the central supporting rod and receiving the enlarged inverted frusto-conical upper end of the latter with close clearance, and a pivot pin mounted in the upper end of the bearing sleeve beyond the bore and projecting into the latter and bearing on the top of the central supporting rod.

6. A structure for indicating the balance of lawn mower blades having central openings, comprising a pedestal, a central supporting rod mounted vertically on said pedestal and having an enlarged inverted frusto-conical upper end, a generally rectangular table having on its bottom a central boss with an axial hole therethrough positioned at the intersection of the longitudinal and transverse center lines, a hollow boss on its top concentrically positioned with respect to the central boss on its bottom for supporting the mower blade, and integral offset portions along its transverse center line, a longitudinally positioned level indicating means on one face of one offset portion of the table, a longitudinally positioned level adjusting means on the other face of said one offset portion of the table, a transversely positioned level indicating means on one face of the other offset portion of the table, a transversely positioned level adjusting means on the other face of said other offset portion of the table, a bearing sleeve secured at its lower end in the axial hole in the central boss, positioned axially of the hollow boss, and having an enlarged bore for the greater part of its length surrounding the central supporting rod and receiving the enlarged inverted frusto-conical upper end of the latter with close clearance, a pivot pin mounted in the upper end of the bearing sleeve beyond the bore and projecting into the latter and bearing on the top of the central supporting rod, and a frusto-conical centering member slidably mounted on the bearing sleeve for reception in the central opening in the mower blade and centering of the latter with respect to the hollow boss on the top of the table.

7. A structure for indicating the balance of lawn mower blades having central openings, comprising a pedestal, a central supporting rod mounted vertically on said pedestal having an enlarged inverted frusto-conical upper end, a generally rectangular table having a central hollow boss positioned at the intersection of its longitudinal and transverse center lines for supporting the mower blade and integral offset portions along its transverse center line, a longitudinally positioned level indicating means on one face of one offset portion of the table, a longitudinally positioned level adjusting means on the other face of the said one offset portion of the table, a transversely positioned level indicating means on one face of the other offset portion of the table, a transversely positioned level adjusting means on the other face of said other offset portion of the table, a bearing sleeve secured at its lower end to the bottom of the table positioned axially of the central hollow boss and having an enlarged bore for the greater part of its length, surrounding the central supporting rod and receiving the enlarged inverted frusto-conical upper end of the latter with close clearance, a pivot pin mounted in the upper end of the bearing sleeve beyond the bore and projecting into the latter and bearing on the top of the central supporting rod, and gauge rods mounted on the table at approximately the level of the top of the hollow boss on the latter and positioned equidistantly on the opposite sides of the hollow boss.

References Cited in the file of this patent

UNITED STATES PATENTS

| | | |
|---|---|---|
| 1,352,905 | Machrol | Sept. 14, 1920 |
| 2,075,421 | Bennett | Mar. 30, 1937 |
| 2,308,950 | Hulslander | Jan. 19, 1943 |
| 2,502,633 | Shepard | Apr. 4, 1950 |
| 2,631,452 | Hutter | Mar. 17, 1953 |
| 2,674,122 | Goltra | Apr. 6, 1954 |
| 2,803,964 | Smith | Aug. 27, 1957 |
| 2,909,063 | Bageman | Oct. 20, 1959 |

FOREIGN PATENTS

| | | |
|---|---|---|
| 731,459 | Great Britain | June 8, 1955 |